United States Patent Office 3,182,236
Patented May 4, 1965

3,182,236
ELECTROLYTE FOR ELECTROLYTIC CAPACITOR
Otto F. C. Stockel, London, England, assignor to Sprague Electric Company, North Adams, Mass., a corporation of Massachusetts
No Drawing. Filed Nov. 20, 1961, Ser. No. 153,742
Claims priority, application Great Britain, Nov. 22, 1960, 40,079/60
1 Claim. (Cl. 317—230)

This invention relates to an electrolyte for electrolytic capacitors, and more particularly to a method of preparing an improved electrolyte of low resistivity and pH less than 7 which is easily controllable.

In electrolytic capacitors an electrolyte having a low resistivity is desirable for reducing the series resistance and thereby giving units of low power factor. A mildly acid electrolyte, for example one having a pH value of about 5.0 to 6.5, is necessary in order to prevent attack by the electrolyte on the electrochemically formed oxide film which constitutes the dielectric of the capacitor. It is also desirable that the electrolyte should exhibit what are known as "forming" properties, in other words that it should be able to form or maintain an oxide film (which constitutes the dielectric) on the anode so as to make good any solution of the film in the electrolyte or defect which occurs in the dielectric film in use or during storage of the capacitor.

For the forming of the oxide film on the anode and its maintenance in good condition it has been proposed to employ, in many commercially used electrolytes, boric acid or its salts, these having excellent film-forming properties. A disadvantage of boric acid however is that it dissociates comparatively freely.

It is known in the art to "activate" boric acid electrolyte by the addition of sugars or polyhydric alcohols, such as mannitol or sorbitol, which have the effect of forming boric acid complexes which are strongly dissociable and which are strongly acid. When ethylene glycol, which heretofore has been generally used, is employed as the base or solvent for the electrolyte, the solubility of the boric acid complexes is low and high resistivities result. The sugars or polyhydric alcohol compounds of the prior art mentioned above as able to activate boric acid by the formation of complex compounds therewith are straight chain compounds having at least two adjacent hydroxyl (—OH) groups, which groups link with two corresponding groups on the boric acid leaving the third hydroxyl (—OH) group of that acid free to ionize.

It is an object of this invention to overcome the above and related deficiencies of the prior art electrolytes.

It is another object of this invention to provide an electrolyte of low resistivity and mildly acid pH value.

It is a further object of this invention to provide a method for preparing an electrolyte that produces a complex compound which is strongly ionized in the electrolyte solvent.

These and other objects of this invention will become apparent upon consideration of the following description and the appended claim.

The objects of this invention are attained by the employment as the activating agent for the boric acid (or salt thereof) of various dihydroxy homocyclic or heterocyclic organic ring compounds, thereby obtaining complexes which are more readily soluble in ethylene glycol and lead to electrolytes of low resistivity and acid pH value.

According to the present invention therefore, the method for the preparation of an electrolyte of low resistivity for electrolytic capacitors consists in dissolving in an ethylene glycol solvent boric acid or a salt thereof together with a homocyclic or heterocyclic organic ring compound having two or more hydroxyl groups which activates the boric acid or salt thereof and produces a complex compound which is strongly ionized in the solvent.

If the solution so obtained should have too low a pH value, then a base is added so as to raise the pH value of the solution to the required extent, for example to about pH 5 to 6.5, so as to render it suitable for use in electrolytic capacitors. For such adjustment of the pH value it is desirable to use an aliphatic amine, such as methylamine, rather than ammonia, which latter is commonly used with conventional electrolytes but would result, in the case of the electrolytes according to the present invention, in the production of complex compounds having too low a solubility.

One particularly suitable compound that has been employed as the activating agent for boric acid or a salt thereof in the preparation of electrolytes according to the present invention is pyrogallol (trihydroxybenzene). Other compounds that may be employed as the activating agent for the boric acid or its salts are orthodihydroxybenzene, paradihydroxybenzene, dihydroxynaphthalene, and dehydroxypyridine.

For the preferred activating agents comprising six member ring compounds it is desirable that two of the hydroxyl groups should be attached to the nucleus in the ortho- or para-positions; meta-attachment of these groups having been found not to be satisfactory. It will be understood however that the activating agents are not restricted to six member ring compounds.

The amount of the activating compound added should not exceed the stoichiometric proportion of the ring compound in relation to the boric acid, good results being usually obtained with less than equivalent quantities.

The following is an example of one method of the preparation of an electrolyte for electrolytic capacitors in accordance with the present invention:

An electrolyte was made by dissolving 50 grams of boric acid and 10 grams of pyrogallol in 100 grams of ethylene glycol. The pH value of the electrolyte so produced was however considerably too low for use in electrolytic capacitors, so the addition of a base was made in order to raise the pH value. Thus the addition of 30 ml. of methylamine to the above solution raised the pH value to about 5.0, and gave a resistivity of about 170 ohm cm. at 50° C. The base was added in the form of an aqueous solution of 25–30% methylamine weight per volume.

It is to be understood that the above-described example is set forth for the purpose of illustration only and that various modifications may be made within the concept of this invention which is limited only by the scope of the appended claim.

What is claimed is:

In an electrolytic capacitor having an oxide coated electrode and another electrode, an electrolyte in conductive contact between said electrodes, said electrolyte consisting essentially of 50 grams of boric acid and 10 grams of pyrogallol in 100 grams of ethylene glycol, said electrolyte having a pH of about 5 by the presence of 30 ml. of methylamine.

References Cited by the Examiner
UNITED STATES PATENTS
2,866,139  12/58  Ross _____ 252—62.2

MAURICE A. BRINDISI, *Primary Examiner.*

JOSEPH R. LIBERMAN, *Examiner.*